United States Patent [19]

Berger

[11] 3,987,487
[45] Oct. 19, 1976

[54] MAGNETIC TRANSDUCER WITH SINGLE TURN WINDING STRUCTURE

[75] Inventor: Henri Berger, Triel, Seine, France

[73] Assignee: Societe d'Applications Generales d'Electricite et de Mecanique S A G E M, France

[22] Filed: Dec. 19, 1974

[21] Appl. No.: 534,375

[30] Foreign Application Priority Data
Dec. 28, 1973  France .............................. 73.46894

[52] U.S. Cl. ............................... 360/123; 360/127
[51] Int. Cl.² ....................... G11B 5/20; G11B 5/14
[58] Field of Search ............ 360/123, 119, 120, 127

[56]  References Cited
UNITED STATES PATENTS
3,789,158   1/1974   Walker et al. ...................... 360/123

Primary Examiner—Robert S. Tupper
Attorney, Agent, or Firm—Larson, Taylor and Hinds

[57]  ABSTRACT

The transducer device for reading or writing information on a magnetic support comprises an insulating plate on one surface of which is deposited in thin layer form a magnetic circuit having an air gap and a conducting metal forming a turn. The turn is short circuited and the transducer device comprises a discrete magnetic circuit whereon is wound a winding and the turn is a primary or secondary winding of the circuit. It can be used as a reading or writing head for a magnetic disc.

14 Claims, 4 Drawing Figures

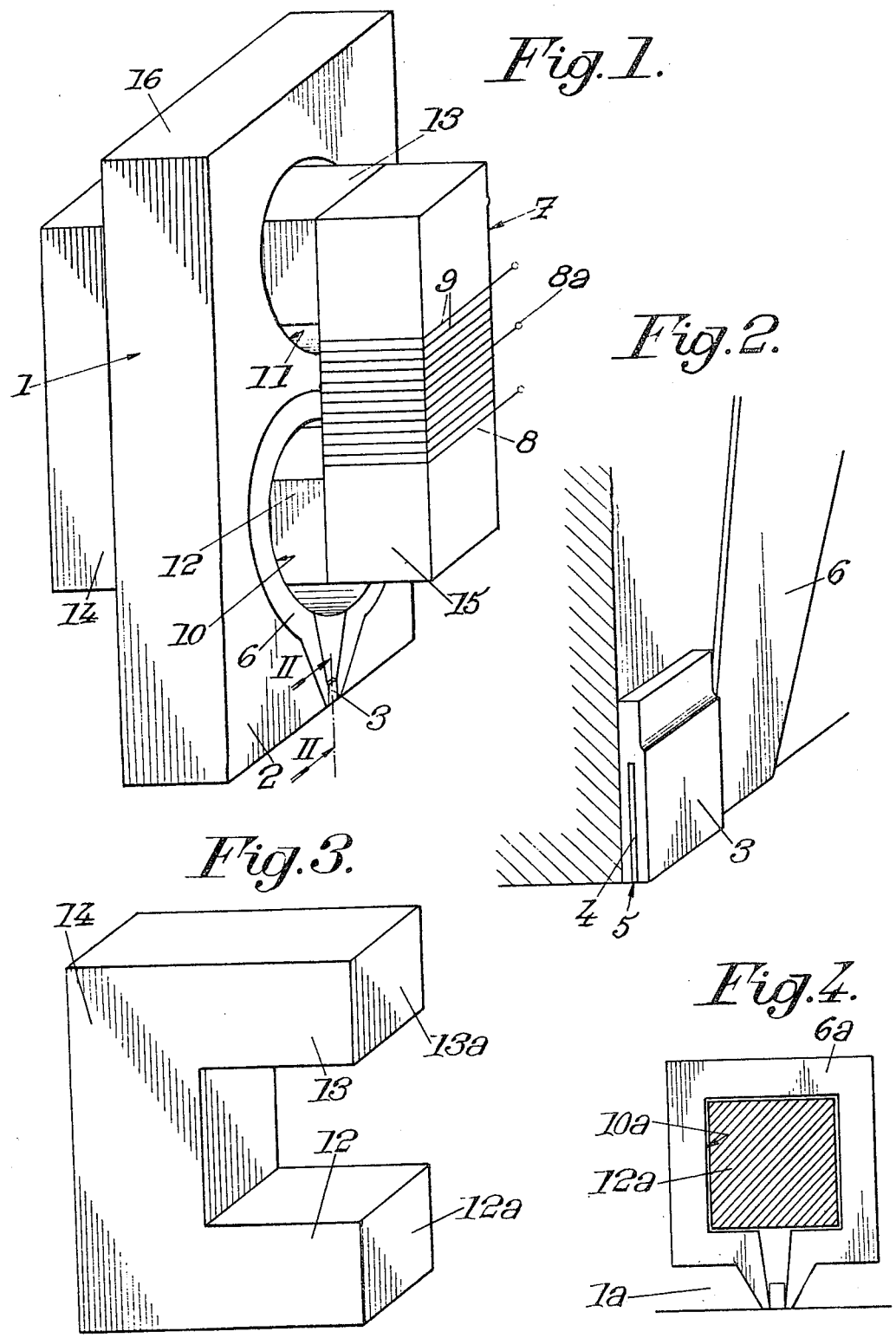

MAGNETIC TRANSDUCER WITH SINGLE TURN WINDING STRUCTURE

BACKGROUND TO THE INVENTION

The invention relates to improvements made to transducer devices for reading or writing information on a magnetic support. It relates more particularly to such transducer devices which have an insulating plate on the surface of which are arranged in thin layers on the one hand a magnetic material forming a magnetic circuit comprising a narrow air gap whose plane is substantially parallel to that of the said surface and on the other hand a single turn of a conducting metal having a zero or substantially zero magnetic permeability and which fills at least in part the said air gap.

Such transducer devices are used more particularly as magnetic heads which are to serve for the reading or writing of binary information, in the form of magnetisation in one direction and in the opposite direction, on tracks of planar discs covered with a magnetic material.

In a known device of this type (IBM Technical Disclosure Bulletin, Vol. 13, No. 2, July 1970, pages 562–564) used to form a magnetic head of the type mentioned hereinbefore, the single turn of conducting metal forms an open circuit. Thus for writing information on a planar disc covered with a magnetic material it is necessary to directly apply to the terminals of this single turn in open circuit, high intensity pulses generally of the order of 1 ampere in order to create in the magnetic circuit having a narrow air gap a magnetic field of sufficient intensity to induce magnetisation on the tracks of a magnetic disc arranged underneath the said air gap. During the reading of information on a magnetic disc by means of such a head, the magnetic flux resulting from the passage of a magnetized portion of a disc track underneath the air gap of the magnetic circuit induces a low voltage of the order of 100 microvolts in the open circuited singleturn. Therefore, the contacts and circuits associated with a head of this type are difficult to make. Moreover, the low value of the reading signal induces at the single turn terminals can be a significant source of errors during the reading of information written on the magnetic disc.

A solution which has been proposed for obviating these difficulties is to produce these magnetic heads by placing in thin layer form several turns of conducting metal in the air gap of magnetic circuit. However, it is particularly difficult and onerous to produce such a magnetic head.

BRIEF SUMMARY OF INVENTION

An object of the present invention is to obviate the disadvantages mentioned hereinbefore and more particularly to supply a magnetic head which is of particularly simple construction, of reduced size and wherein the electrical current intensity applied for writing purposes has a relatively low value and wherein the voltage collected during reading is relatively large.

According to the invention, in a transducer device of the type mentioned hereinbefore, the thin layer of the said conducting metal forms a turn which is closed in itself and the device comprises a discrete magnetic circuit whereon is wound wiring or reading winding whereby the said discrete magnetic circuit is operated in such a way that the said turn constitutes a primary or secondary winding of the said discrete magnetic circuit.

Preferably, the said plate has at least one opening which traverses and issues into the turn which is closed on itself and the said magnetic circuit comprises a first longitudinal branch which can be passed through the said opening.

The plate advantageously has a second opening which traverses it and issues externally of the turn and the discrete magnetic circuit has in this case a second longitudinal branch which can be passed through this second opening. It is then advantageous for the said discrete magnetic circuit to have a first transverse branch which interconnects the first ends of the first and second longitudinal branches whereby the said first transverse branch forms a continuos member with the two said longitudinal branches.

According to another aspect, the invention relates to a transducer device element, said transducer being adapted to read or write information on a magnetic support; the said element comprises an insulating plate on one surface of which are arranged in thin layer form on the one hand a magnetic material forming a magnetic circuit with an air gap whose plane is substantially parallel to the plane of the said surface and on the other hand a conducting metal having a zero or substantially zero magnetic permeability and which at least in part fills the said air gap. According to the invention, this element is characterized in that the layer of the said conducting metal forms a single turn which is closed on itself. Preferably, the said plate has at least one opening which issues into the single turn which is closed on itself.

BRIEF DESCRIPTION OF THE DRAWINGS

Other and further objects of the present invention will be apparent from the following description and claims and are illustrated in the accompanying drawings which by way of illustration show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the scope of the appended claims.

In the drawings:

FIG. 1 shows a perspective view of a transducer device according to the invention.

FIG. 2 shows a partial view in section along the plane II—II of FIG. 1, also in perspective, this section being on a larger scale than FIG. 1.

FIG. 3 shows part of the magnetic circuit of the device shown in FIG. 1.

FIG. 4 is a partial plan view of a variant of the transducer device according to the invention.

DETAILED DESCRIPTION OF THE PREFERRED EMBODIMENTS

A transducer device to be described relative to FIGS. 1 to 4 is intended to realize a magnetic head for reading and writing information on tracks of a magnetic disc (not shown). Such a head is generally located at the end of an arm (also not shown). The disc, arm and head form part of the peripheral equipment of a computer.

A transducer device shown in FIGS. 1 and 2 comprises in per se known manner an insulating plate 1 having at least one planar surface 2. In the example, plate 1 comprises a single member made from an insulating material such as a ceramic material. In a first variant plate 1 is made from pure silicon and in a second variant this plate is made from glass. On surface 2 is placed a material having ferromagnetic properties, the material being in the present case an alloy of nickel and iron. It is known that the magnetic properties of this alloy are such that it substantially has no hysteresis loop. This material is deposited in the form of thin layers so as to form a magnetic circuit 3 having an air gap 4 (FIG. 2) which extends along a plane parallel to surface 2 and its thickness is very small (of the order of 1 micron). The lower portion 5 of this air gap extends longitudinally in a direction which is normally radial relative to the magnetic disc (not shown) with which the said transducer device must co-operate. This air gap is filled with a conducting metal, e.g. copper, which is connected to a layer 6, which is also thin, and of the same metal deposited on surface 2 of plate 1. This copper layer 6 deposited directly on surface 2 and the copper layer filling air gap 4 form a turn. Furthermore, magnetic circuit 3 encloses via its air gap 4 the lower portion of copper turn 6.

According to the invention, turn 6 is closed on itself, i.e. it is short circuited. Turn 6 forms the primary or secondary of a magnetic circuit 7 comprising a winding 8 having a certain number, N, of turns 9 of a conducting wire. In the example, winding 8 has a central tap 8a.

It should be noted that henceforth magnetic circuit 7 which is in the form of a discrete circuit (as opposed to magnetic circuit 3 which comprises thin layers, i.e. forming an integrated circuit) forms the magnetic circuit of a transformer whose primary and secondary comprise winding 8 and turn 6 or vice versa. During the reading of information written on a magnetic disc track, turn 6 serves as the primary winding and thus winding 8 forms the secondary. During this reading operation, the passage of a magnetised portion of a disc track underneath the lower portion of air gap 4 causes a magnetic flux variation in the said air gap. A voltage, U, is thus induced in short circuited turn 6 and the said voltage U causes the appearance of a voltage of value N U at the terminals of winding 8 whereby as already stated, N represents the number of turns in the said winding. For writing information on a magnetic circuit track, it is merely necessary to apply pulses of appropriate amplitude to the terminals of winding 8 in such a way as to generate a current in turn 6 which creates a magnetic field whose direction is tangential to the magnetic disc tracks. During reading a large voltage is thus obtained and during writing only a relatively low current is supplied.

In the embodiment of the invention shown in the drawings, two openings 10 and 11 are provided in plate 1 to permit the passage of two branches 12 and 13 of magnetic circuit 7. It is important to note that opening 10 issues inside i.e., extends or passes through, turn 6 in such a way that the latter can surround or embrace branch 12 of magnetic circuit 7. Moreover, opening 11 issues externally of said turn 6 that is, extends through plate 16 at a location spaced from turn 6.

In the example, magnetic circuit 7 comprises a ferritetype material and branches 12 and 13 have a substantially square cross-section. Branches 12 and 13, which will be called hereinafter longitudinal branches, form a single member with transverse branch 14 which interconnects them by one of their ends. Branches 12 and 13 (FIGS. 1 and 3) can thus be easily introduced into openings 10 and 11 because they form with branch 14 a U-link which can easily be manipulated. The free ends 12a and 13a of longitudinal branches 12 and 13 are connected by a second transverse branch 15 also made of ferrite and which in the example has the same cross-sectional branches 12, 13 and 14. Winding 8 is wound onto the central portion of branch 15 which is fixed to the ends 12a and 13a of branches 12 and 13, for example, by means of a thin coating of glue.

As regards the dimensions of the magnetic head described hereinbefore relative to FIGS. 1 to 3 it should be noted that in a special embodiment the total thickness of the magnetic circuit 3 in thin layer form and made from a nickel-iron alloy is 7 microns whilst the thickness of air gap 4 which is filled with copper is 1 micron. The thickness of the copper layer forming turn 6 and which is placed directly on surface 2 of plate 1 is also about 1 micron. In this embodiment, the width of the integrated magnetic circuit is 40 microns and the opening 10 and 11 have a diameter of 1 mm. The cross-section of the various branches of magnetic circuit 7 is square, the side length being about 0.7 mm. The thickness of ceramic plate 1 is 0.5 mm. It should be noted that the nickel-iron alloy contains about 80% by weight of nickel and 20% by weight of iron. With such proportions, this nickel-iron alloy is a soft magnetic material without a hysteresis loop. In addition, it does not become deformed under the action of the magnetic field, its magnetostriction properties being negligible. Finally, in thin layer form, such an alloy has a resistivity which is substantially greater than that of copper, i.e. of the order of 50 times.

As a result of experiments performed within the scope of the invention, the inventor noted that the various thin layers can be deposited in the following way: firstly, a first layer of the above-indicated iron-nickel alloy is deposited on surface 2 by electrolysis through a mask. This is followed also by electrolysis through a mask by the deposition of a layer of copper on the said first layer. Finally a third electrolytic deposition of the said alloy through a mask takes place.

Numerous variants of the transducer device described relative to FIGS. 1 to 4 are possible without departing from the scope of the invention. In particular, turn 6 and opening 10 which in the examples shown in fIG. 1 are circular may have different shapes. A front view of a variant of said short circuited turn is shown in FIG. 4.

Turn 6a shown in FIG. 4 is substantially square and opening 10a which traverses plate 1a is also square. In this embodiment, branch 12a of the magnetic circuit substantially completely fills opening 10a. This embodiment has the advantage relative to that shown in FIG. 1 of reduced lengthwise dimensions.

The invention is also not limited to the particular configuration of the magnetic circuit described which can for example have a circular cross-section. However, in connection with the variants is should be noted that opening 11 is not indispensable and branch 13 could, for example, be arranged above upper edge 16 of planar plate 1.

Therefore, no matter what embodiment is used for realizing the magnetic head according to the invention, this has numerous advantages mentioned hereinbefore. Of particular significance is the advantage that the reading signal has a high value and the control current applied for writing at the terminals of winding 8 is divided in the ratio N. Moreover, this magnetic head is of particularly simple construction and its size is therefore relatively small. Finally turn 6 can be made from a metal other than copper because it is not necessary to have contacts on this turn.

This magnetic head or transducer device can be used wherever information is to be written or read (generally binary information) in the form of magnetisations on a magnetic support and more particularly, but not exclusively, on tracks which can be very narrow of a magnetic disc. The invention is not limited to the applications, and embodiments described and more particularly several magnetic heads according to the invention can be associated with the same insulating plate 1. In this case, which is not shown in the drawings, it is advantageous to have a member which is common to the discrete magnetic circuits of these heads. It is possible, for example, to make the transverse branches 14 of these heads in one piece whereby the longitudinal branches 12 and 13 of each of the heads also form one piece with that which forms the branches 14. Thus a comb-shaped member is obtained whose teeth are formed by branches 12 and 13.

While there has been described and illustrated the preferred embodiments of the invention, it is to be understood that these are capable of variation and modification and it is not therefore desired to be limited to the precise details set forth but to include such modifications and alterations as fall within the scope of the appended claims.

I claim:

1. A trandsucer device for reading or writing information on a magnetic medium comprising:
    an insulating plate including at least one substantially planar surface that terminates at an edge which, in operation, is disposed in proximity to the said magnetic medium,
    a plurality of thin layers deposited on the substantially planar surface, said layers comprising: a first layer of magnetic material deposited on the said substantially planar surface near said edge thereof; a layer of conducting metal, having a substantially zero permeability, deposited (1) on a portion of said first layer which is adjacent to said edge so as to cover said portion and to leave a further portion of said first layer which is not covered and (2) on said substantially planar surface of the plate, said layer of conducting material forming a turn which is closed upon itself; and a second layer of said magnetic material deposited (1) on the portion of the layer of conducting material which covers the first layer of magnetic material and (2) on the portion of the first layer of magnetic material which is not covered by the layer of conducting material, and
    a discrete magnetic circuit whereon is wound a reading/writing winding, said discrete circuit including a longitudinally extending branch which is surrounded by said turn, said plate including at least one opening therein one end of which terminates in said substantially planar surface, said layer of conducting material surrounding said end, and said longitudinally extending branch of said discrete magnetic circuit extending through said opening.

2. A device according to claim 1 wherein the general configuration of the said turn is substantially square.

3. A device according to claim 1 wherein the general configuration of the said turn is circular.

4. A device according to claim 1 wherein the general configuration of the said turn is substantially rectangular.

5. A device according to claim 1 wherein the plate is made from ceramic material.

6. A device according to claim 1 wherein the discrete magnetic circuit is made from a ferrite-based material.

7. A device according to claim 1 wherein the conducting metal forming the said turn is copper and wherein the magnetic material is an alloy containing about 80% by weight nickel and 20% by weight iron.

8. A device according to claim 1 wherein said plate has a second opening therein one end of which terminates in said substantially planar surface, said one end of said second opening being located externally of said turn, and wherein the discrete magnetic circuit includes a further longitudinally extending branch which extends through said second opening.

9. A device according to claim 8 wherein the discrete magnetic circuit has a first transverse branch which interconnects first ends of said longitudinally extending branches so that first traverse branch forms an unitary member with said longitudinally extending branches.

10. A device according to claim 9 wherein the said discrete magnetic circuit has a second transverse branch whereon is wound the said winding whereby this second transverse branch interconnects the second ends of the two longitudinal branches in such a way as to close the said magnetic circuit.

11. A transducer device for reading or writing information on a magnetic medium comprising:
    an insulating plate including at least one substantially planar surface which terminates at an edge which, in operation, is located near the said magnetic medium, said plate including at least one opening therein which terminates at one end thereof in said substantially planar surface,
    a plurality of thin layers deposited on the substantially planar surface, said layers comprising: a first layer of magnetic material deposited on the said substantially planar surface near said edge thereof; a layer of a conducting metal, having substantially zero permeability, deposited (1) on a portion of said first layer which is adjacent to said edge so as to cover said portion and to leave a further portion of said layer which is not covered, and (2) on the said substantially planar surface of the plate, said layer of conducting metal forming a turn which is closed upon itself and surrounds said end of said opening; and a second layer of said magnetic material deposited on the portion of the layer of conducting metal which covers the first layer of magnetic material and on the portion of said first layer which is not covered by the layer of conducting metal, and
    a discrete magnetic circuit whereon is wound a reading/writing winding, said discrete magnetic circuit including a longitudinal branch which extends through said opening.

12. A transducer element for a transducer which is adapted to read or write information on a magnetic medium, said element comprising:
    an insulating plate including, at least one substantially planar surface which terminates at an edge which, in operation, is to be located adjacent to the said magnetic medium, and
    a plurality of thin layers deposited on the substantially planar surface, said layers comprising: a first layer of magnetic material deposited on the said substantially planar surface near said edge thereof; a layer of a conducting metal, having substantially zero permeability, deposited on a portion of said first layer adjacent to the said edge and on said substantially planar surface of the plate, said layer of conducting metal defining a turn having a closed geometrical configuration; and a second layer of said magnetic material deposited on the portion of the layer of conducting metal which covers the first layer of magnetic material and on the portion of the first layer of magnetic material which is not covered by the layer of conducting metal.

13. An element according to claim 12 wherein said plate has at least one opening therein which terminates within said turn so that said turn surrounds said opening.

14. An element according to claim 13 wherein the said plate has at least one further opening which opens into said planar surface at a location which is external of said turn.

* * * * *